(12) United States Patent
Netsch et al.

(10) Patent No.: US 7,961,920 B2
(45) Date of Patent: Jun. 14, 2011

(54) METHOD FOR THE COMPUTER-ASSISTED VISUALIZATION OF DIAGNOSTIC IMAGE DATA

(75) Inventors: Thomas Netsch, Hamburg (DE); Stewart Young, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1138 days.

(21) Appl. No.: 10/596,467

(22) PCT Filed: Dec. 9, 2004

(86) PCT No.: PCT/IB2004/052731
§ 371 (c)(1),
(2), (4) Date: Jun. 14, 2006

(87) PCT Pub. No.: WO2005/062259
PCT Pub. Date: Jul. 7, 2005

(65) Prior Publication Data
US 2007/0276194 A1    Nov. 29, 2007

(30) Foreign Application Priority Data
Dec. 19, 2003   (EP) .................................. 03104817

(51) Int. Cl.
*G06K 9/00* (2006.01)
(52) U.S. Cl. ..................................................... 382/128
(58) Field of Classification Search ................... 382/128
See application file for complete search history.

(56) References Cited

U.S. PATENT DOCUMENTS

| | | | |
|---|---|---|---|
| 5,151,856 A | | 9/1992 | Halmann et al. |
| 5,633,951 A | * | 5/1997 | Moshfeghi ............... 382/154 |
| 6,268,730 B1 | * | 7/2001 | Du ........................... 324/309 |
| 6,351,573 B1 | | 2/2002 | Schneider |
| 6,567,687 B2 | * | 5/2003 | Front et al. ............... 600/426 |
| 6,775,405 B1 | * | 8/2004 | Zhu ........................... 382/154 |
| 2001/0041835 A1 | * | 11/2001 | Front et al. ............... 600/429 |
| 2002/0057825 A1 | | 5/2002 | Evron et al. |
| 2003/0069494 A1 | | 4/2003 | Jolly |
| 2004/0097805 A1 | * | 5/2004 | Verard et al. ............. 600/428 |

OTHER PUBLICATIONS

Bullitt, E., et al.; Analysis of Time-Varying Images Using 3D Vascular Models; 2001; IEEE Computer Society; pp. 9-14.
Etienne, A., et al.; "Soap Bubble" Visualization and Quantitative Analysis of 3D Coronary Magnetic Resonance Angiograms; 2002; MRM; 48:658-666.
Graves, E.E., et al.; Registration of magnetic resonance spectroscopic imaging to computed tomography for radiotherapy treatment planning; 2001; Medical Physics; 28(12)2489-2496.
Guttman, M.A., et al.; Analysis and Visualization of Cardiac Function from MR Images; 2003; http://www.mri.jhmi.edu/emcveigh/docs/papers/cga97.pdf.

* cited by examiner

*Primary Examiner* — Samir A Ahmed
*Assistant Examiner* — Ruiping Li

(57) ABSTRACT

In a computer-assisted visualization of a three-dimensional anatomical object, two or more diagnostic image data records (1, 3, 4, 5) of the object are recorded. Thereafter, an imaging specification is defined for imaging the image data (1, 3, 4, 5) onto a two-dimensional display plane (8). In order to define the imaging specification, anatomical features (2) of the object are identified in at least one of the image data records (1). Finally, a combined two-dimensional representation is calculated by imaging the two or more image data records (1, 3, 4, 5) according to the previously defined imaging specification onto a common display plane (8).

16 Claims, 2 Drawing Sheets

METHOD FOR THE COMPUTER-ASSISTED VISUALIZATION OF DIAGNOSTIC IMAGE DATA

BACKGROUND

The invention relates to a method for the computer-assisted visualization of a three-dimensional anatomical object, wherein at least two diagnostic image data records of the object are recorded and processed.

The invention furthermore relates to a diagnostic imaging device for carrying out the method and to a computer program for such a diagnostic imaging device.

In the field of angiography, two-dimensional X-ray projection methods are routinely used nowadays to show blood vessels by injecting suitable contrast agents. More recently, however, three-dimensional angiographic imaging methods are becoming increasingly important, such as three-dimensional X-ray imaging (CT) or magnetic resonance imaging (MR). The volume image data obtained by such methods contain interesting morphological information for diagnosing vascular disorders, such as stenoses or aneurysms for example. The visualization of the recorded vascular structures is important in both two-dimensional and three-dimensional medical imaging methods so that a treating physician can rapidly and reliably detect potential sources of risk (e.g. risk of infarct, thrombosis, or a risk that an aneurysm will burst).

Modern computer-assisted visualization methods make it possible on the one hand to show the course of blood vessels with high accuracy, wherein it may be possible to screen out any anatomical structures that do not belong to the vascular system of interest. Moreover, computer-assisted visualization methods are also a useful aid when planning interventions, such as percutaneous transluminal coronary angioplasty (PTCA) for example.

Furthermore, two- and three-dimensional imaging methods are known which are used not so much to clarify the morphology of blood vessels, as in the case of the above-described angiography methods, but rather make it possible to examine the function of an organ, for example the heart, which is supplied by the corresponding blood vessels. Such methods may be used in addition to angiographic methods to diagnose for example coronary vessel disorders. Methods are known in which temporal series of two- or three-dimensional diagnostic image data records of the heart are recorded and evaluated in order to discover functional disorders of the myocardium. For this purpose, regions of the myocardium which differ from the normal function are identified in the recorded image data. This may be assessed for example on the basis of thickened or thinned areas of the heart wall or even on the basis of observed abnormal movements of the heart wall. Moreover, functional imaging methods are known, such as the so-called MR perfusion method for example, which allow the blood flow through the myocardium to be examined. In the MR perfusion method, a parameter image is generated on the basis of a temporal sequence of MR images, wherein it is calculated, for each pixel, how the concentration of an applied contrast agent changes over time at the position of the respective pixel.

In order to allow simple and reliable diagnosis, it is desirable when visualizing diagnostic image data to combine morphological (e.g. angiographic) image data with functional image data in a joint representation, specifically such that pathological changes in morphology can be directly placed in relation with corresponding functional disturbances. Thus, a representation is to be possible for example which can be used by the treating physician to assign a stenosis that can be detected in an angiographic image to incorrect function in a corresponding region of the myocardium. For this purpose, in U.S. Pat. No. 5,151,856 it is proposed, starting from three-dimensional diagnostic image data records recorded by means of MR or CT, firstly to calculate a three-dimensional model of the examined myocardium using a computer. Based on this model, the functions in the various regions of the myocardium are then examined. In addition, two-dimensional angiographic projection images are recorded which show a two-dimensional representation of the morphology of the coronary arteries. Finally, the calculated model of the myocardium is visualized as a three-dimensional representation, wherein the recorded angiogram is superposed on this representation. To do this, the angiogram is suitably scaled and aligned in order to show the anatomical conditions in a manner that is as close to reality as possible. Regions of the myocardium in which functional disturbances have been identified can be emphasized using color according to the previously known method. The known method thus makes it possible to directly assign functional disturbances of the heart to visible morphological changes in the coronary arteries.

One particular disadvantage of the previously known method is that the superposition of the two-dimensional angiogram and the three-dimensional view of the heart model is not very well defined in geometric terms, and this leads to inaccuracies and errors which have a negative effect on diagnosis. Another disadvantage is that the three-dimensional view of the heart model, which in the previously known method is generated by a so-called rendering algorithm known per se, is not optimal for allowing standardized depiction, e.g. in medical reports. Moreover, the reproducibility of the three-dimensional visualization is not always satisfactory since the concrete representation depends on a large number of individually adaptable parameters. For these reasons, the doctors involved find such three-dimensional views rather undesirable.

SUMMARY

On this basis, it is an object of the invention to provide a method for computer-assisted visualization which allows a combined representation of two or more diagnostic image data records, wherein the representation is to be precisely defined in geometric terms and exactly reproducible. Moreover, a three-dimensional view of the anatomical features contained in the image data records is to be avoided.

According to the invention, firstly two or more diagnostic image data records of the anatomical object that is to be visualized are recorded. Thereafter, an imaging specification is defined for imaging the image data onto a two-dimensional display plane, wherein in order to define the imaging specification anatomical features of the object are identified in at least one of the image data records. Finally, a combined two-dimensional representation is calculated by imaging the two or more image data records according to the previously defined imaging specification onto the common display plane.

It is essential that the method according to the invention completely omits the generation of a three-dimensional view of the three-dimensional anatomical object that is to be visualized. As a result, the above-described disadvantages due to the three-dimensional representation are largely avoided. Instead, according to the invention a two-dimensional representation is calculated, specifically according to an imaging specification which is determined uniformly and in a geometrically well-defined manner, taking account of the anatomy shown by the image data, for all the image data records that are to be jointly visualized. The purely two-dimensional representation also has the advantage in particular of being able to be depicted in a standardized and reproducible manner, for example in medical reports.

When defining the imaging specification, for example the projection geometry for a projection of the image data onto the common display plane may be defined. In this case, use may be made of the so-called "soap bubble" method in expanded form which is known per se from the prior art (cf. Etienne et al., "Soap Bubble" Visualization and Quantitative Analysis of 3D Coronary Magnetic Resonance Angiograms, Magnetic Resonance in Medicine, Volume 48, page 658, 2002). The soap bubble algorithm then receives its parameters by virtue of the identification according to the invention of the anatomical features contained in the recorded image data records. One important fundamental idea of the invention is accordingly to define the imaging specification according to the anatomy identified using the image data. The identification of the anatomical features for defining the imaging specification may be carried out both interactively, for example by a user of a corresponding imaging device, or else automatically by means of recording algorithms known per se.

It is also particularly important that in the method according to the invention—both when identifying the anatomical features and when calculating the joint two-dimensional representation—the relative spatial arrangement of the image areas covered in each case by the recorded image data records is taken into account. The spatial positioning of the individual image areas takes place during planning of the actual recording of the diagnostic images, e.g. in the case of MR imaging, usually once so-called scout image data records have been recorded. The latter are low-resolution anatomical image data records which cover the entire examination volume of interest. The manual or automatic positioning of the image areas on the basis of the scout image data records then supplies the necessary geometric information to be able to compare the diagnostic image data with one another in spatial terms and display them together according to the invention.

In order to define the imaging specification an object volume delimited by a curved surface is determined in which the anatomical features of the object that are to be identified in the image data records are contained. The surface shape of the object volume may be shaped in a manner corresponding to the shape of the anatomical object to be examined, for example the heart or another organ. The surface of the object volume is for example firstly adapted to the outer contours of the anatomical object. The imaging specification then results from the result of this adaptation, according to which imaging specification the anatomical features contained in the object volume are projected. The image data lying outside the object volume are screened out. One possibility for adapting a curved surface which delimits an object volume to the outer contours of the anatomical object (the heart) to be examined is described in the abovementioned document by Etienne et al. One alternative possibility for calculating the two-dimensional representation includes assigning Cartesian coordinates within the display plane to non-Cartesian surface coordinates of the object volume. The object volume may for example have an ellipsoid shape. The surface of the ellipsoid can then be parameterized by polar coordinates. In order to display the projection in a two-dimensional manner on the surface of the object volume, the polar coordinates can be converted into corresponding Cartesian coordinates in a particularly simple manner. The imaging specification is thereby clearly defined in geometric terms, although account should be taken of the fact that distances between anatomical features of the object cannot be reproduced in a realistic manner. In principle, there may be used in the method according to the invention any type of imaging by means of which any curved surface in three-dimensional space is imaged onto a two-dimensional display plane.

The method according to the invention may advantageously be used for the combined displaying of morphological and functional image information relating to the examined anatomical object. In this case, the precisely defined imaging specification for imaging the image data onto the two-dimensional display plane is a prerequisite to it being possible for pathological changes that can be detected in the morphological image data to be reliably assigned to corresponding disturbances that can be detected in the functional image data. The functional image information may be obtained, as in the abovementioned MR perfusion method for example, by evaluating temporal sequences of morphological image data of the anatomical object. This is possible in particular when using the method according to the invention to examine coronary vessel disorders since, as mentioned above, incorrect functions of the myocardium can be successfully determined by assessing the wall thickness and the movement of the myocardium.

At least one of the image data records comprises a slice image of the anatomical object. Accordingly, the method according to the invention can be used to combine a number of slice images in a joint two-dimensional representation.

The image data records may be recorded by computer tomography, magnetic resonance or ultrasound. There is also the possibility of using different imaging modes to record the image data records. According to the invention, it is thus possible for example for image data obtained by ultrasound to be combined with MR image data in a joint representation.

A diagnostic imaging device is suitable for carrying out the method according to the invention. Said diagnostic imaging device has recording means for recording three-dimensional image data records of an anatomical object, and computer means for visualizing the image data. The computer means are provided with program control, by means of which the above-described method according to the invention can be carried out.

The method according to the invention may be made available to the users of such diagnostic imaging devices in the form of a corresponding computer program. The computer program may be stored on suitable data carriers, such as CD-ROMs or floppy disks for example, or it may be downloaded via the Internet onto the computer means of the imaging device.

BRIEF DESCRIPTION OF THE DRAWINGS

The invention will be further described with reference to examples of embodiments shown in the drawings to which, however, the invention is not restricted.

DETAILED DESCRIPTION

Figure 1:
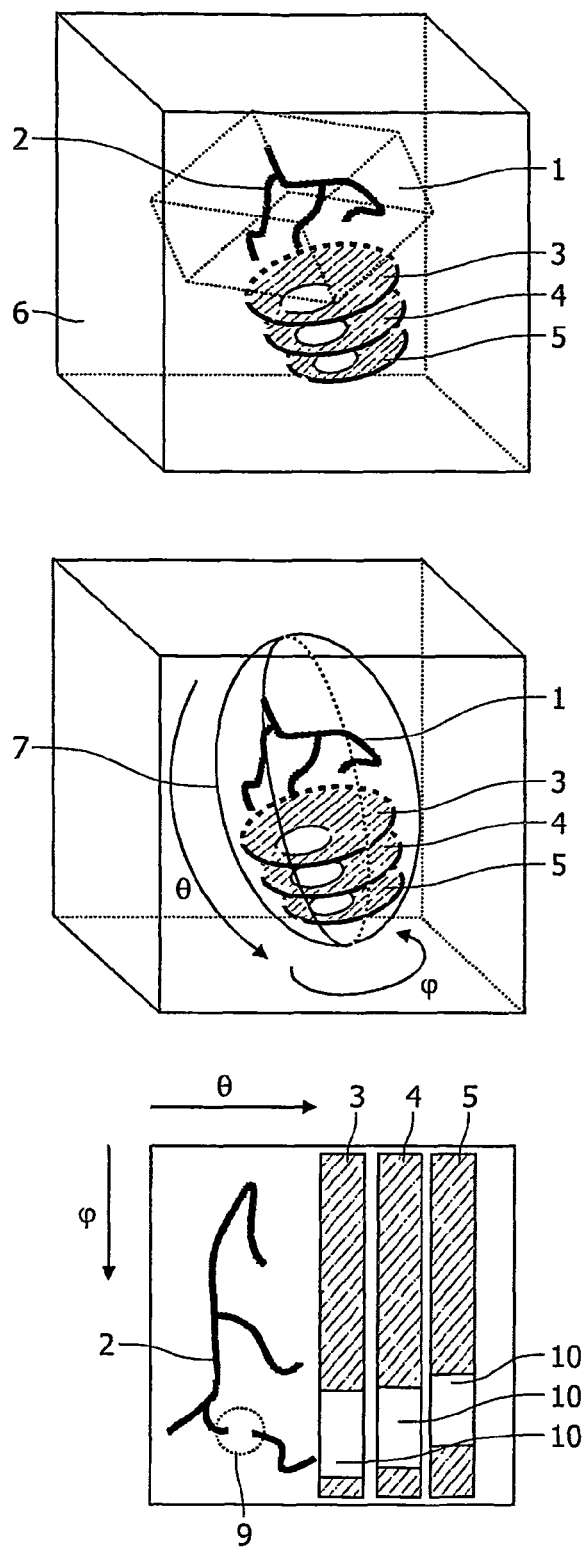
FIG. 1 shows a schematic diagram of the progress of the method according to the invention.

FIG. 1 shows the method according to the invention on the basis of a cardiological MR examination for assessing the morphology and functional condition of the heart of a patient. The method begins with the recording of various diagnostic image data records of the heart. FIG. 1 shows at the top the diagram of an image data record 1 which is recorded by means of three-dimensional MR coronary artery imaging. The course of the coronary arteries 2 within the image data record 1 can be seen in FIG. 1. Moreover, three functional slice images 3, 4 and 5 of the myocardium are produced by means of the abovementioned MR perfusion technique. The slice images 3, 4 and 5 show for each pixel the respective flow of blood through the myocardium in a plane perpendicular to the longitudinal axis of the heart. With reference to the top and middle diagrams of FIG. 1, it can be seen how the image data records 1, 3, 4 and 5 are spatially arranged relative to one another within an examination volume 6. This relative spatial arrangement is either defined by planning the recording of the images or must be determined subsequently, for example using suitable recording algorithms.

The definition of an imaging specification for imaging the image data 1, 3, 4 and 5 onto a two-dimensional display plane is shown in the middle diagram of FIG. 1. In order to define the imaging specification, in the example of embodiment the shape, the position and the orientation of an ellipsoid object volume 7 are adapted to the anatomical features of the heart, which can be seen from the image data records 1, 3, 4 and 5. The longitudinal axis of the ellipsoid 7 in this case approximately corresponds to the heart axis, and the surface of the ellipsoid 7 roughly corresponds to the outer contour of the myocardium. According to the imaging specification, the image information of the data records 1, 3, 4 and 5 which is contained in the object volume 7 is projected onto the surface of the ellipsoid 7. The ellipsoid shape is selected here only for the purpose of illustration. Other surface shapes may be selected depending on the anatomy to be examined. In order to define the imaging specification, it is also possible for example for the coronary arteries 2 to be identified by means of a suitable recording algorithm.

n the next step, the actual visualization of the image data takes place, and this is shown in the bottom diagram in FIG. 1. In the example of the illustrated embodiment, a combined two-dimensional representation is calculated by imaging the image data records 2, 3, 4 and 5 according to the previously defined imaging specification onto a common display plane 8. For this purpose, Cartesian coordinates within the display plane 8 are assigned to the polar coordinates θ and (φ by means of which the surface of the ellipsoid object volume 7 is parameterized. The morphology of the coronary arteries 2 can be seen very well in the two-dimensional representation. In particular, it can be seen in this representation that one of the vessels has a stenosis 9. The projections of the slice images 3, 4 and 5 in the display plane 8 show a lack of blood flow through the myocardial tissue in a region 10. Using the two-dimensional representation generated according to the invention, the treating physician can thus directly assign the pathological change 9 to the functional disturbance in the regions 10.

Figure 2:
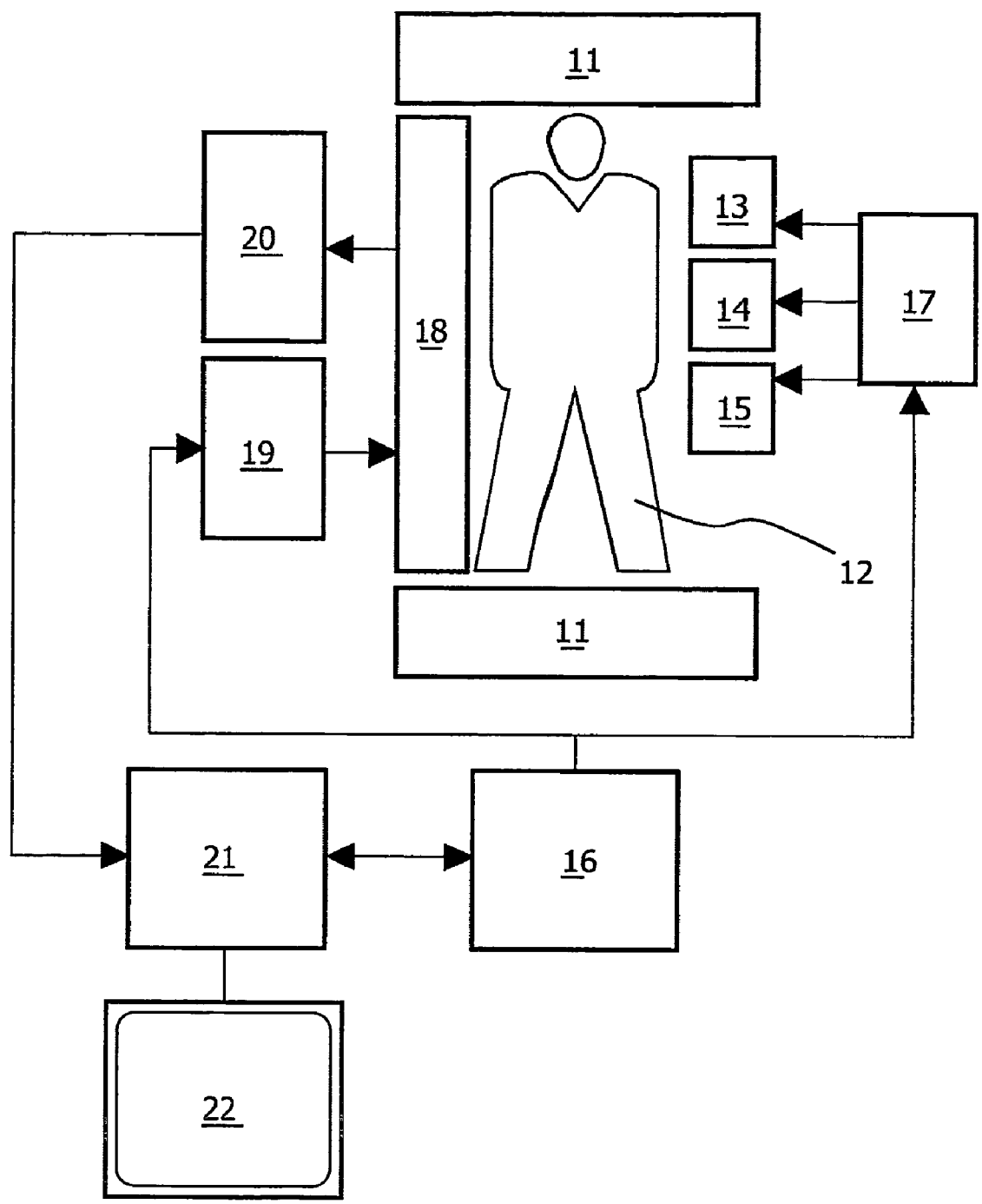
FIG. 2 shows an MR device according to the invention.

The diagnostic imaging device shown as a block diagram in FIG. 2 is an MR device of conventional design. The MR device consists of a main field coil 11 for generating a homogeneous static magnetic field in an examination volume in which a patient 12 is located. The MR device furthermore has gradient coils 13, 14 and 15 for generating magnetic field gradients in different spatial directions within the examination volume. The computer means of the diagnostic imaging device shown are formed by a central control unit 16 which is connected to the gradient coils 13, 14 and 15 via a gradient amplifier 17. The temporal and spatial profiles of the magnetic field gradients within the examination volume are controlled thereby. The image recording means of the MR device include a high-frequency coil 18 which is used to generate high-frequency fields in the examination volume and to receive MR signals from the examination volume. The high-frequency coil 18 is connected to the control unit 16 via a transmitting unit 19. The MR signals received by the high-frequency coil 18 are demodulated by a receiving unit 20 and amplified and fed to a reconstruction and visualization unit 21 which likewise belongs to the computer means of the diagnostic imaging device. The MR signals processed by the reconstruction and visualization unit 21 can then be displayed by a screen 22 in the manner according to the invention. The reconstruction and visualization unit 21 and the control unit 16 have suitable program control for carrying out the above-described method.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method for the computer-assisted visualization of a three-dimensional anatomical object, comprising the following method steps:
   a) recording two or more diagnostic image data records of the object wherein at least one image data record comprises morphological image information of the anatomical object and at least one further image data record comprises functional image information relating to the anatomical object;
   b) defining an imaging specification for imaging the image data onto a common two-dimensional display plane, the definition of the imaging specification involving an identification of anatomical features of the object in at least one of the image data records and a determination of an object volume delimited by a curved surface in which the anatomical features of the object are contained;
   c) calculating a combined two-dimensional representation by imaging the two or more image data records according to the previously defined imaging specification onto the common two-dimensional display plane wherein a projection of the image information of the data records that is contained in the object volume is calculated during the calculation of the combined two-dimensional representation, wherein in order to calculate the combined two-dimensional representation, Cartesian coordinates within the common two-dimensional display plane are assigned to non-Cartesian surface coordinates of the curved surface.

2. A method for the computer-assisted visualization of a three-dimensional anatomical object, comprising the following method steps:
   a) recording two or more diagnostic image data records of the object wherein at least one image data record comprises morphological image information of the anatomical object and at least one further image data record comprises functional image information relating to the anatomical object, wherein the functional image information is obtained by evaluating a temporal sequences of morphological image data of the anatomical object;
   b) defining an imaging specification for imaging the image data onto a common two-dimensional display plane, the definition of the imaging specification involving an identification of anatomical features of the object in at least one of the image data records and a determination of an object volume delimited by a curved surface in which the anatomical features of the object are contained;

c) calculating a combined two-dimensional representation by imaging the two or more image data records according to the previously defined imaging specification onto the common two-dimensional display plane wherein a projection of the image information of the data records that is contained in the object volume is calculated during the calculation of the combined two-dimensional representation.

3. The method as claimed in claim 1, wherein at least one of the image data records comprises at least one slice image of the anatomical object.

4. The method as claimed in claim 1, wherein the image data records are recorded by means of computer tomography, magnetic resonance or ultrasound.

5. The method as claimed in claim 1, wherein the image data records are recorded using different imaging modes.

6. A method generating a two-dimensional representation on a display plane of three-dimensional anatomical features of interest of an anatomical object, the method comprising:
recording a morphological diagnostic image record of the anatomical object and a functional diagnostic image record of the anatomical object;
delimiting an object volume which includes the anatomical features of interest of the anatomical object with a curved surface, the curved surface being defined in non-Cartesian coordinates;
defining an imaging specification by:
  a) projecting the anatomical features of interest from one of the morphological or functional diagnostic image records onto the curved surface to determine a first projection, the projecting of the anatomical features of interest onto the curved surface being performed in the non-Cartesian coordinates, and
  b) projecting the anatomical features along parallel rays from the curved surface onto the display plane to determine a second projection, an imaging specification begin defined by the first and second projections;
using the imaging specification to project the anatomical features of interest of the morphological and functional diagnostic image records onto the display plane to generate the two-dimensional representation of the anatomical features of interest.

7. The method as claimed in claim 6, further including:
transforming the anatomical features projected on the curved surface into Cartesian coordinates, the projecting of the anatomical features from the curved surface to the imaging plane being performed in the Cartesian coordinates.

8. The method as claimed in claim 7, wherein the non-Cartesian coordinates include polar coordinates.

9. The method as claimed in claim 7, wherein the curved surface includes at least a portion of the ellipsoid.

10. The method as claimed in claim 6, further including:
performing a scout scan with an MR imaging system to identify a location of the anatomical features of interest;
based on the scout scan, controlling the MR imaging system to generate the morphological and functional image records.

11. One or more processors programmed to perform the method as claimed in claim 6.

12. A non-transitory computer readable medium carrying software which controls one or more processors to perform the method as claimed in claim 6.

13. A imaging system comprising:
at least one diagnostic imaging system which generates a morphological diagnostic image record and a functional diagnostic image record;
one or more processors which perform the method as claimed in claim 6 to generate the two-dimensional image representation from the morphological and functional diagnostic image records; and
a display unit on which the two dimensional image representation is displayed.

14. One or more processors programmed to perform the method as claimed in claim 2.

15. A non-transitory computer readable medium carrying software which controls one or more processors to perform the method as claimed in claim 1.

16. A imaging system comprising:
at least one diagnostic imaging system which generates a morphological diagnostic image record and a functional diagnostic image record;
one or more processors which perform the method as claimed in claim 1 to generate the two-dimensional image representation from the morphological and functional diagnostic image records; and
a display unit on which the two dimensional image representation is displayed.

* * * * *